(12) United States Patent
Kobayashi et al.

(10) Patent No.: US 8,946,587 B2
(45) Date of Patent: Feb. 3, 2015

(54) LASER MACHINING APPARATUS

(75) Inventors: Takuo Kobayashi, Tochigi (JP); Shin Yoshida, Tochigi (JP); Izuru Hori, Tochigi (JP); Masahiro Koike, Tochigi (JP); Kenichi Fukami, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 13/595,206

(22) Filed: Aug. 27, 2012

(65) Prior Publication Data

US 2013/0098876 A1   Apr. 25, 2013

(30) Foreign Application Priority Data

Oct. 19, 2011   (JP) ................. 2011-230096

(51) Int. Cl.
| | | |
|---|---|---|
| *B23K 26/38* | (2014.01) | |
| *B23K 26/08* | (2014.01) | |
| *B23K 26/14* | (2014.01) | |
| *B23K 37/02* | (2006.01) | |
| *B23K 26/12* | (2014.01) | |

(52) U.S. Cl.
CPC .............. *B23K 26/0838* (2013.01); *B23K 26/14* (2013.01); *B23K 26/38* (2013.01); *B23K 37/0235* (2013.01); *B23K 26/123* (2013.01); *B23K 2201/16* (2013.01); *B23K 2201/18* (2013.01); *B23K 2203/04* (2013.01)
USPC ............ 219/121.67; 219/121.78; 219/121.82; 219/121.84

(58) Field of Classification Search
CPC ........... B23K 26/0838; B23K 26/0846; B23K 26/0876; B23K 26/1458; B23K 26/0892; B23K 26/123; B23K 26/14; B23K 26/38; B23K 37/0235; B23K 37/0408; B23K 37/04; B23K 2201/16; B23K 2201/18; B23K 2203/04; B26D 7/01; B26D 7/02
USPC ............ 219/121.67, 121.72, 121.82, 121.78, 219/121.79, 121.84; 83/81, 155
See application file for complete search history.

(56) References Cited

U.S. PATENT DOCUMENTS

| | | | | |
|---|---|---|---|---|
| 4,417,125 A | * | 11/1983 | Tsutsumi | ................. 219/121.82 |
| 4,724,297 A | * | 2/1988 | Nielsen | .................... 219/121.67 |
| 6,621,045 B1 | * | 9/2003 | Liu et al. | .................... 219/121.7 |

(Continued)

FOREIGN PATENT DOCUMENTS

CN   101049877   10/2007

(Continued)

OTHER PUBLICATIONS

Japanese Office Action issued Sep. 30, 2014, 2 pages.
Chinese Office Action dated Aug. 22, 2014, Application No. 201210397469.4.

*Primary Examiner* — Geoffrey S Evans
(74) *Attorney, Agent, or Firm* — Rankin, Hill & Clark LLP

(57) ABSTRACT

A laser machining apparatus is provided with: a workpiece support unit; a machining head; and a machining head moving unit. The workpiece support unit includes: an end support part that supports a width end of a workpiece; and an inside support part that supports an inside portion of the workpiece in a width direction. The end support part is movable in a longitudinal direction independently from the inside support part in response to a movement of the machining head.

3 Claims, 3 Drawing Sheets

(56) References Cited

U.S. PATENT DOCUMENTS

| | | |
|---|---|---|
| 2006/0105612 A1* | 5/2006 | Moncavage .................. 439/377 |
| 2007/0227672 A1 | 10/2007 | Kameda |
| 2008/0173623 A1* | 7/2008 | Barclay et al. .......... 219/121.72 |
| 2008/0179304 A1* | 7/2008 | Osako et al. ............... 219/121.6 |
| 2009/0212033 A1 | 8/2009 | Beck et al. |
| 2011/0205278 A1 | 8/2011 | Haba |
| 2012/0055762 A1* | 3/2012 | Kobayashi et al. ........ 198/699.1 |
| 2012/0103252 A1 | 5/2012 | Watanabe |

FOREIGN PATENT DOCUMENTS

| | | |
|---|---|---|
| CN | 102105256 | 6/2011 |
| CN | 201864072 | 6/2011 |
| CN | 102190172 | 9/2011 |
| JP | S63-068293 | 3/1988 |
| JP | H04-055085 | 2/1992 |
| JP | 2003-103388 | 4/2003 |
| WO | 2011/001648 | 1/2011 |
| WO | WO-2011/033647 A1 * | 3/2011 |

* cited by examiner

LASER MACHINING APPARATUS

BACKGROUND OF THE INVENTION

1. Field of the Invention

The present invention relates to a laser machining apparatus for machining a workpiece using a laser beam and an assist gas.

2. Related Art

In general, when a laser machining apparatus cuts a metal sheet workpiece, an assist gas is ejected from a nozzle of a machining head onto a portion to be machined while a laser beam is being emitted. Here, a material of the portion of the workpiece that is to be machined is melted or evaporated by the laser beam and is removed by the assist gas. Therefore, the workpiece to be machined is supported using a multi-pin type support means, such that the laser beam does not strike members for supporting the workpiece.

When the machining is performed in this way, a phenomenon in which the portion of the workpiece to be machined is sequentially pressed away from the nozzle by the assist gas from the nozzle and then is returned by elasticity tends to occur. When this phenomenon occurs, the portion to be machined vibrates and a distance to the nozzle is changed. Accordingly, machining conditions are not maintained constant, thereby making accurate machining difficult.

This problem becomes significant, in particular, when machining is started from an edge of the workpiece. That is, at a portion of the workpiece edge in which the machining is started, the distance between the nozzle and the portion to be machined is greatly changed due to a weak supporting force provided by a multi-pin type support means, and owing to the assist gas being abruptly ejected. Therefore, instability in machining conditions becomes significant. In addition, there is a problem in that, for example, the nozzle and the workpiece interfere with each other because the portion that is to be machined is significantly displaced.

In order to effectively avoid such a problem caused by the ejection of the assist gas, machining is conventionally performed at a low speed. In addition, it is also known to perform machining by providing a support means for locally supporting a workpiece by surrounding a machining position below the machining head, and then by sequentially and locally supporting respective portions of the workpiece that are to be machined.

For example, in a laser cut machining device disclosed in Patent Document 1 (JP-A-2003-103388), a support means for supporting an object to be machined is composed of a holder, which surrounds a nozzle of a machining head and of which a distance to the lower end is identical with a focal length of a laser beam, and a support plate, which brings the object to be machined into close contact with the holder by urging the object upward. When machining, the object to be machined is supported by an XY stage and is moved between the machining head and the holder and between the machining head and the support plate. At this time, the holder and the support plate locally support a portion of the object to be machined that is currently positioned between the holder and the support plate.

However, when machining a steel strip produced by sequentially uncoiling a coil material, it is required to move a machining head with respect to a workpiece. In this case, in order to apply the local support means for locally supporting the workpiece as disclosed in Patent Document 1 in the machining of the coil material and while supporting width ends of the workpiece, it is required to provide a mechanism that moves the support means together with the machining head in a wide range that covers the width ends of the workpiece.

Since this mechanism increases the cost of the apparatus due to the increased scale, the local support means is not suitable for the case in which the coil material is machined as a workpiece. In addition, when a multi-pin type support means, which supports entire portions of the workpiece from below, is used, the foregoing local support means cannot be employed since the local support means interferes with pins of the multi-pin type support means.

SUMMARY OF THE INVENTION

Embodiments of the invention provide a laser machining apparatus that can suppress a width end of a workpiece from being displaced by an assist gas, using a simple configuration.

BRIEF DESCRIPTION OF THE DRAWINGS

FIG. 2(*b*) is a view of the XY stage seen in a Y direction from a downstream of a direction in which a workpiece is conveyed.

DETAILED DESCRIPTION OF THE EMBODIMENTS

Figure 1:
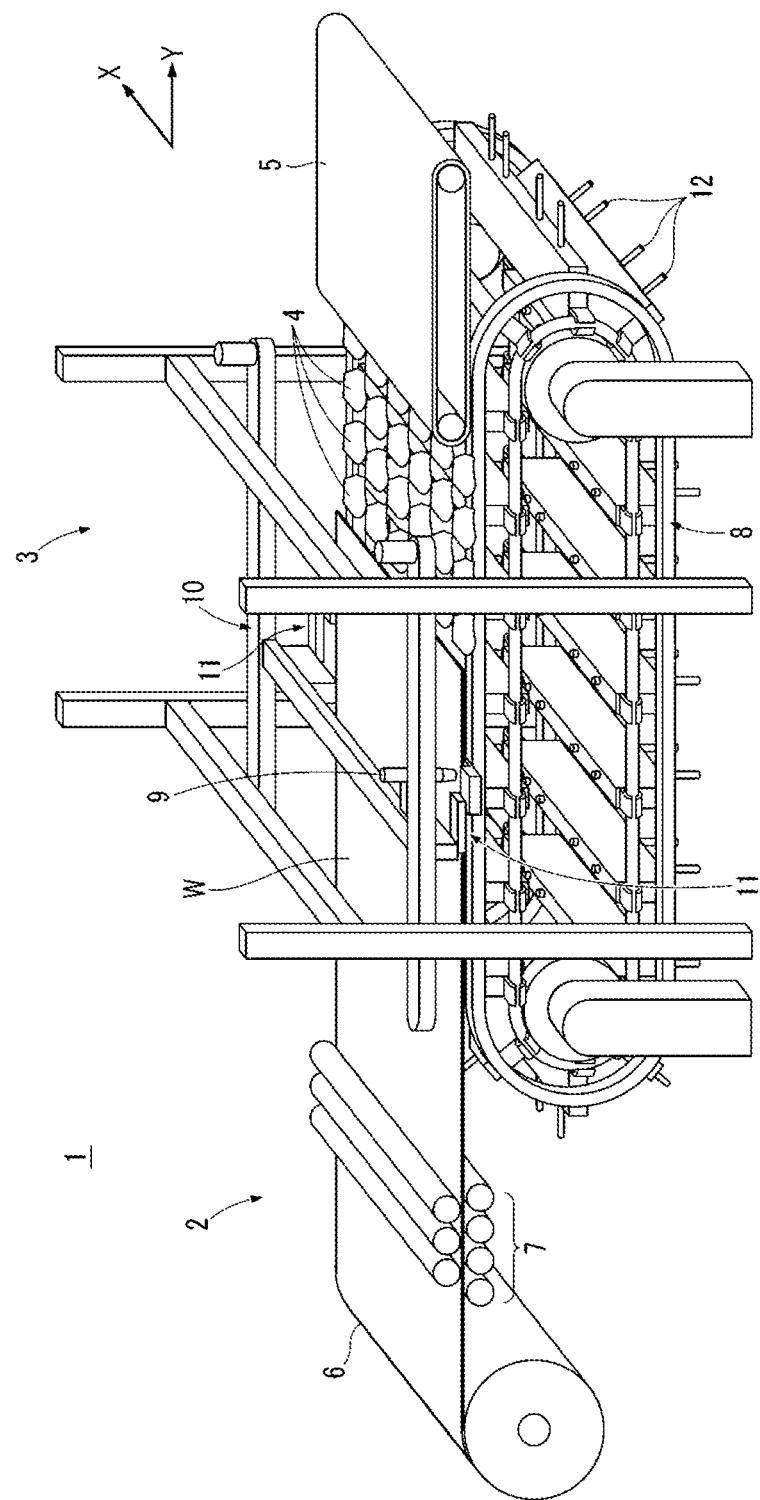
FIG. 1 is a perspective view schematically showing a configuration of a laser machining apparatus according to an embodiment of the invention.

An exemplary embodiment will be described hereinafter with reference to the accompanying drawings. As shown in FIG. 1, the laser machining apparatus includes a workpiece supply unit 2, which supplies a workpiece W, a workpiece-machining unit 3, which cuts the workpiece W supplied from the workpiece supply unit 2, and a magnet conveyor 5, which conveys blanks 4, which are cut from the workpiece W by the workpiece-machining unit 3, to the next process.

The workpiece supply unit 2 includes a coil material 6 on which a steel strip is wound and a leveler 7, which corrects the distortion of the coil material 6 by causing the coil material 6 to pass between rolls. The supply of the workpiece W to the workpiece-machining unit 3 is performed by uncoiling the coil material 6 and sending the coil material 6 as the workpiece W to the workpiece-machining unit 3 while removing the distortion, such as peculiar winding, using the leveler 7.

The workpiece-machining unit 3 includes a conveyor 8, which supports and conveys the workpiece W supplied from the workpiece supply unit 2, a machining head 9, which cuts the workpiece W supported on the conveyor 8, an XY stage 10, which moves the machining head 9 in the X direction, i.e. the width direction, and in the Y direction, i.e. the longitudinal direction, and two end support part 11, which are provided on the XY stage 10. Each of the two end support part 11 supports a corresponding one of both width ends of the workpiece W supported on the conveyor 8.

The XY stage 10 corresponds to a machining head moving unit in the present invention. The conveyor 8 corresponds to an inside support part in the present invention. In addition, the end support part 11 and the conveyor 8 constitute a workpiece support unit of the invention.

The conveyor 8 is a multi-pin type supporting means, and includes a plurality of support members 12 and serve to support the lower surface of the workpiece W. When the workpiece W is supplied from the workpiece supply unit 2, the conveyor 8 supports the lower surface of the portions of the workpiece W that are more inward than the both width ends of the workpiece W using the support members 12. The workpiece W is supported by the respective support members 12 so as to be supported at positions thereof that a laser beam from the machining head 9 does not strike. This aims to avoid the support members 12 from being influenced by the laser beam.

The XY stage 10 drives the machining head 9 along a machining path along which the workpiece supported on the conveyor 8 is to be machined. At this time, the machining head 9 performs a cutting process by radiating a laser beam and ejecting an assist gas on the workpiece W.

Figure 2A:
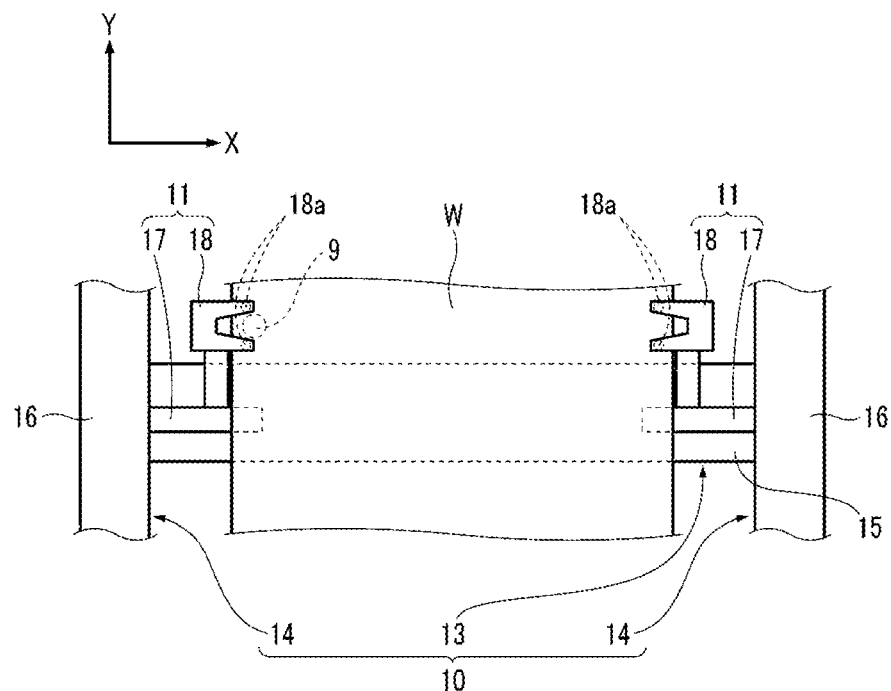
FIG. 2(*a*) is a view schematically showing a configuration of an XY stage of the apparatus shown in FIG. 1 which is seen from lower side.
Figure 2B:
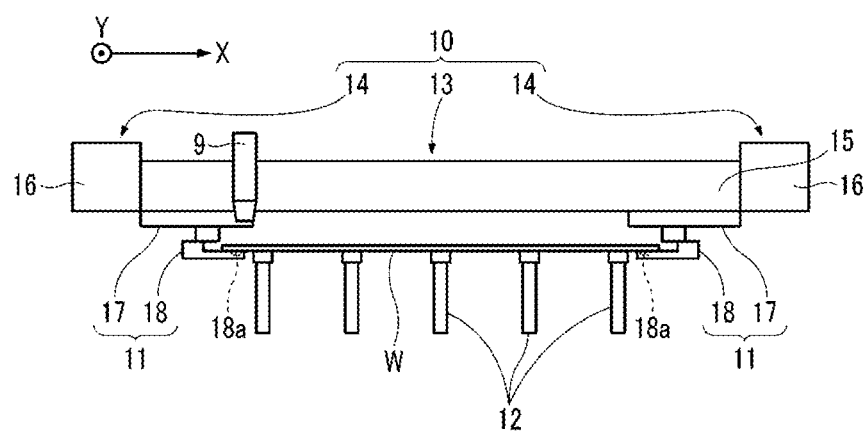

FIGS. 2(a) and 2(b) show the XY stage part in the workpiece-machining unit 3. In FIG. 2(a), shows the shape of the XY stage 10 viewed from below, and FIG. 2(b) shows the XY stage viewed in the Y direction from the downstream of the direction in which the workpiece W is conveyed.

As shown in FIGS. 2(a) and 2(b), the XY stage 10 is an H-type Gantry stage, and includes a first drive mechanism 13, which drives the machining head 9 in the X direction, and a second drive mechanism 14, which drives the first drive mechanism 13 in the Y direction. The first drive mechanism 13 guides the machining head 9 in the X direction using an X-direction guide member 15 provided in the X direction, and drives the machining head 9 in the X direction using a servo motor (not shown).

The second drive mechanism 14 guides both ends of the X-direction guide member 15 in the Y direction using two Y-direction guide members 16 that extend in the Y direction, and drives the X-direction guide member 15 in the Y direction using a servo motor (not shown). Thereby, the first drive mechanism 13 is driven in the Y direction.

Under both ends of the X-direction guide member 15, two sliders 17 and two holding portion 18, each pair of which constitutes a corresponding one of the above-described two end support part 11, are provided. The holding portion 18 are driven by the sliders 17. Each of the sliders 17 adjusts the position of the holding portion 18 by driving a corresponding one of the holding portion 18 as required.

Each of the holding portion 18 has two Bernoulli pads 18a, which are arranged in the Y direction. Each width end of the workpiece W, which is supported by the support members 12 of the conveyor 8, is held by a corresponding one of the holding portion 18 with the Bernoulli pad 18a being interposed therebetween. This holding is performed in a non-contact fashion based on the Bernoulli's principle. As shown in FIG. 2(a), the Y-direction position of each holding portion 18 is set such that the Y direction position of the machining head 9 is placed intermediate between the two Bernoulli pads 18a of each holding portion 18.

In this configuration, when the workpiece W is to be cut, the coil material 6 is planarized by the leveler 7, and is sequentially supplied as the workpiece W to the workpiece-machining unit 3 by the workpiece supply unit 2.

In the workpiece-machining unit 3, the conveyor 8 supports and conveys the workpiece W that is supplied, using the support members 18 interposed therebetween. This conveyance is performed so that units of the machining workpiece W that are to be machined by every predetermined length are sequentially positioned at a machining position below the XY stage 10. In addition, the X direction position of the holding portion 18 is adjusted by the slider 17 so that the holding portion 18 can properly support the width ends of the workpiece W in the respective end support part 11.

The cutting process is performed for the respective units of the workpiece W that are to be machined, which are sequentially positioned at the machining position. That is, when a unit of the workpiece W that is to be machined is positioned at the machining position, the machining head 9 is moved along the predetermined machining path by the XY stage 10. During this, a laser beam is radiated on the workpiece W from the machining head 9, and an assist gas is ejected on the position on which the laser beam is radiated. This causes the workpiece W to be machined and cut along the machining path. When the cutting process on the #machining unit is completed, the next machining unit is positioned at the machining position by the conveyor 8, and the cutting process is performed in the same manner.

In the cutting process, both width ends of the workpiece W are supported by the respective end support part 11 on the XY stage 10. At this time, since the Y direction position of the machining head 9 is placed intermediate between the two Bernoulli pads 18a of each end support part 11, each end support part 11 moves in the Y direction independently from the conveyor 8 while being synchronously positioned in a position corresponding to the Y direction of the machining head 9.

Therefore, when the machining head 9 machines the width end of the workpiece W, the portion of the workpiece W that is to be machined is necessarily held and supported by the holding portion 18 of the end support part 11. In addition, this supporting is performed while the support position is being changed in response to the movement of the machining head 9, independently from supporting the workpiece W using the conveyor 8.

Figure 3:
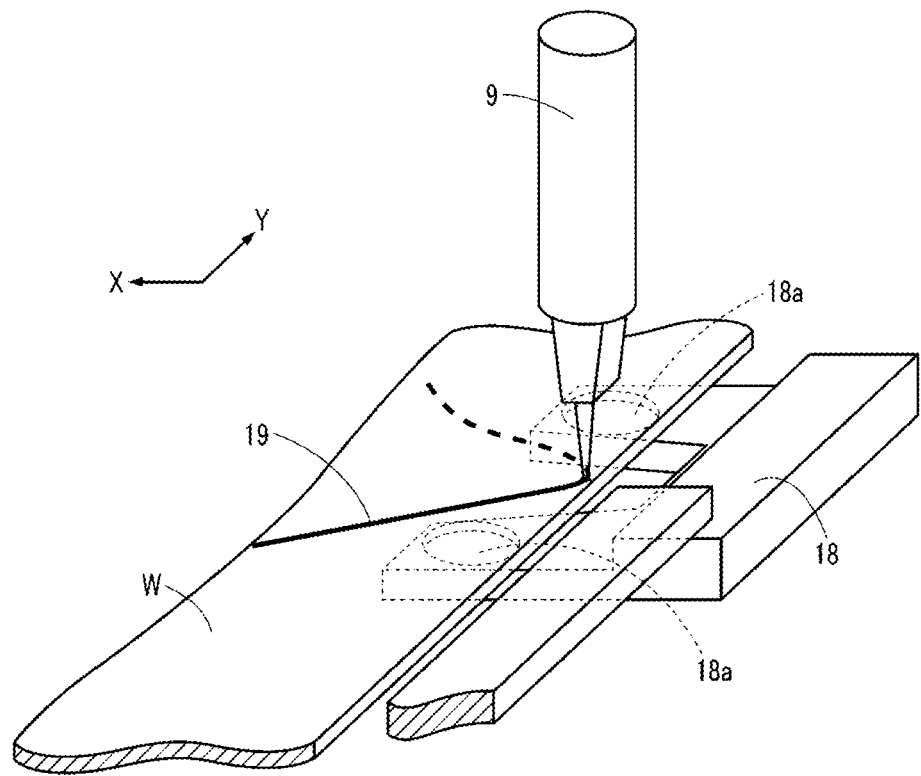
FIG. 3 is a perspective view schematically showing a shape in which a width end of the workpiece is being machined by the apparatus shown in FIG. 1.

FIG. 3 is a view showing the shape in which one width end of the workpiece W is machined. As shown in FIG. 3, when the width end of the workpiece W is machined along the machining path 19, in the case of a conventional laser machining apparatus that is not provided with the holding portion 18, even though the width end of the workpiece W is supported by a multi-pin type support member, at the width end, the surroundings of the portion that is to be machined are less uniformly supported than the inner portion of the workpiece. In addition, the force of supporting the surroundings is weaker than the force of supporting the inner portion. Therefore, the portion that is to be machined tends to be displaced and vibrated by the assist gas ejected from the machining head.

In particular, when starting to cut the workpiece W by causing the laser beam from the machining head to intersect an edge of the workpiece W from the outside, since the assist gas is abruptly ejected to the portion of the workpiece W that is to be machined at an end thereof, the portion of the workpiece W that is to be machined violently vibrates. When the portion that is to be machined vibrates, it is difficult to properly machine the portion that is to be machined since the portion that is to be machined deviates from the focal position of the laser beam, and the workpiece W even collides against the machining head.

In contrast, in the present invention, when the width end of the workpiece W is machined, the surroundings of the portion that is to be machined are supported by the holding portion 18, as shown in FIG. 3. This supporting is performed on both sides of the portion that is to be machined, which are in the Y direction, by the two Bernoulli pads 18a of each holding portion 18.

Accordingly, each Bernoulli pad 18a holds a corresponding portion of the workpiece W by drawing the rear surface thereof via suction in a non-contact fashion, and maintains the corresponding portion in the direction perpendicular to the plane of the workpiece W. Due to this, the corresponding portion is supported so as to be movable in the Y direction. The workpiece is supported in this way with the supporting position thereof being changed in the Y direction in response to the movement of the machining head 9.

Due to the supporting by the holding portion 18, the portion of the width end that is to be machined is effectively suppressed from being displaced by the ejection of the assist gas. When starting to machine the workpiece W in such a manner that the edge of the workpiece W is intersected, the portion that is to be machined is suppressed from being displaced in the same manner. Therefore, the width end of the workpiece W is properly machined while the machining conditions are being effectively maintained.

As shown in FIG. 1, the blanks 4, which are sequentially produced due to the above-described machining process, are delivered from the conveyor 8 to the magnet conveyor 5, which sequentially conveys the blanks so as to be provided to the following process such as press processing.

As described above, according to this embodiment, since the end support part 11 is always positioned at the Y direction position corresponding to the Y direction position of the machining head 9, the portion that is to be machined can always be supported by the end support part 11 when the machining head 9 machines the width end of the workpiece W. Therefore, when machining the width end of the workpiece W, the force of supporting the portion that is to be machined can be increased. This can consequently suppress the portion that is to be machined from being vibrated by the assist gas, thereby properly maintaining machining conditions.

In addition, since the end support part 11 are provided on both ends of the X-direction guide member 15, at a position corresponding to the Y direction position of the machining head 9, it is possible to support the width ends of the workpiece W while changing the support position independently from supporting the workpiece W using the conveyor 8. In addition, this supporting of the width ends of the workpiece W can be realized using a simple configuration.

Although the embodiment has been described above, the present invention is not limited thereto. For example, although the multi-pin type support means is used as the inside support part in the embodiment, another support mechanism, for example, a honeycomb-type support mechanism may be used.

In addition, in the above-described embodiment, a non-contact type using the Bernoulli pads 18a is employed as the holding portion 18. The suction mechanism is not limited to the use of the Bernoulli pads 18a, but another suction mechanism such as a magnet may be used. In addition, although the non-contact type is preferable in order to suppress resistance due to sliding on the workpiece W or damage due to contact with the workpiece W, a contact type may also be used.

In accordance with the above embodiments and examples, a laser machining apparatus may include: a workpiece support unit that supports a workpiece having a predetermined width; a machining head that radiates a laser beam while ejecting an assist gas on a portion to be machined; and a machining head moving unit that moves the machining head along a machining path on the workpiece supported by the workpiece support unit. The workpiece support unit may include: an end support part that supports a width end of the workpiece; and an inside support part that supports an inside portion of the workpiece in a width direction. The end support part may be movable in a longitudinal direction of the workpiece independently from the inside support part in response to a movement of the machining head, the end support part being synchronized with the movement of the machining head and corresponding to a position of the machining head in the longitudinal direction of the workpiece.

According to this structure, when the machining head moves, the position of the machining head in the longitudinal direction of the workpiece is also changed. At this time, the end support part is also synchronously moved to a position corresponding to the position of the machining head in the longitudinal direction. The movement of the end support part is performed in the longitudinal direction of the workpiece, independently from the inside support part.

Due to this, when the machining head machines the width end of the workpiece, the end support part moves so as to correspond to the position of the machining head in the longitudinal direction of the workpiece. Therefore, the end support part can support the surroundings of the portion of the workpiece that is to be machined. Therefore, according to the invention, it is possible to strengthen the force of supporting the portion that is to be machined in the width end, thereby suppressing the portion that is to be machined from being displaced.

In addition, since the end support part moves synchronous with the movement of the machining head in the longitudinal direction of the workpiece, it is sufficient that the end support part supports the width end of the workpiece only in the position corresponding to the position of the machining head. Therefore, the end support part can be configured in a simple way.

In addition, since the width end of the workpiece is supported by the end support part and the portion more inward than the width end of the workpiece is supported by the inside support part, the end support part can be provided so as not to interfere with the inside support part.

The machining head moving unit may include: a first drive mechanism that drives the machining head in the width direction; and a second drive mechanism that drives the first drive mechanism in the longitudinal direction which is perpendicular to the width direction. The first drive mechanism may include a guide member that movably guides the machining head in the width direction. The end support part may be provided on an end of the guide member.

Due to this configuration, it is possible to synchronously move the end support part to the position corresponding to the position of the machining head in the longitudinal direction of the workpiece by providing only the end support part on the end of the guide member of the first drive mechanism. In addition, it is possible to perform the movement in the longitudinal direction of the workpiece, independently from the inside support part.

The end support part may include a holding portion that holds the width end of the workpiece in a non-contact fashion in a direction perpendicular to a plane of the workpiece. Due to this, it is possible to properly support the width end of the workpiece so as to be movable in the longitudinal direction of the workpiece.

What is claimed is:
1. A laser machining apparatus comprising:
a workpiece support unit that supports a workpiece having a predetermined width;
a machining head that radiates a laser beam while ejecting an assist gas on a portion to be machined; and
a machining head moving unit that moves the machining head along a machining path on the workpiece supported by the workpiece support unit, wherein the workpiece support unit includes:
an end support part that supports a width end of the workpiece; and
an inside support part that supports an inside portion of the workpiece in a width direction,
wherein the end support part is movable in a longitudinal direction of the workpiece independently from the inside support part in response to a movement of the machining head, the end support part being synchronized with the movement of the machining head and corresponding to a position of the machining head in the longitudinal direction of the workpiece.

2. The laser machining apparatus according to claim 1, wherein the machining head moving unit includes:
a first drive mechanism that drives the machining head in the width direction; and
a second drive mechanism that drives the first drive mechanism in the longitudinal direction which is perpendicular to the width direction,
wherein the first drive mechanism includes a guide member that movably guides the machining head in the width direction, and
wherein the end support part is provided on an end of the guide member.

3. The laser machining apparatus according to claim 1, wherein the end support part includes a holding portion that holds the width end of the workpiece in a non-contact fashion in a direction perpendicular to a plane of the workpiece.

\* \* \* \* \*